United States Patent [19]
Ellenberger et al.

[11] Patent Number: 5,925,699
[45] Date of Patent: Jul. 20, 1999

[54] CONCRETE CURING ADMIXTURES

[75] Inventors: Peter Ellenberger, Feldmeilen; Bernhard Leikauf, Linn; Qiwei Yang, Zurich, all of Switzerland

[73] Assignee: MBT Holding AG, Zurich, Switzerland

[21] Appl. No.: 08/847,789

[22] Filed: Apr. 28, 1997

Related U.S. Application Data

[63] Continuation of application No. 08/550,188, Oct. 30, 1995, abandoned.

[30] Foreign Application Priority Data

Nov. 1, 1994 [GB] United Kingdom .................. 9421984

[51] Int. Cl.$^6$ .............................. C08K 5/06; C08F 63/91; C08L 71/02
[52] U.S. Cl. ...................... 524/377; 524/376; 525/54.24; 525/54.31; 525/187
[58] Field of Search .................................... 524/376, 377; 525/54.24, 54.31, 187

[56] References Cited

U.S. PATENT DOCUMENTS

| | | | |
|---|---|---|---|
| 3,624,018 | 11/1971 | Eilers ........................ | 524/377 |
| 4,590,227 | 5/1986 | Nakamura et al. ..................... | 523/130 |
| 4,743,244 | 5/1988 | Le Khac ................................ | 525/187 |
| 4,818,534 | 4/1989 | Levy ...................................... | 424/404 |
| 4,891,295 | 1/1990 | Kakimi ................................... | 430/138 |
| 5,063,272 | 11/1991 | Sasse ...................................... | 524/377 |
| 5,109,042 | 4/1992 | Stephens ................................ | 524/376 |
| 5,185,039 | 2/1993 | Hamaguchi et al. ................... | 106/728 |

FOREIGN PATENT DOCUMENTS

| | | | |
|---|---|---|---|
| 0 179 937 A1 | 5/1986 | European Pat. Off. ........ | C08L 21/00 |
| 0179937 | 5/1986 | European Pat. Off. . | |
| 0 641 746 A2 | 3/1995 | European Pat. Off. ........ | C04B 28/02 |
| 1349467 | 4/1974 | United Kingdom ............ | C04B 13/28 |
| 2 164 930 | 4/1986 | United Kingdom ............ | C04B 24/28 |
| WO 94/02428 | 2/1994 | WIPO ............................. | C04B 24/28 |
| WO9402428 | 2/1994 | WIPO . | |
| 0022940 | 10/1994 | WIPO ................................... | 524/377 |

OTHER PUBLICATIONS

WPI Abstract Accession No. 89–251885/35 (JP 010182362 A SAOTOME) Jul. 20, 1989.
Patent Abstract of Japan, Publication No. 06115996, Publication Date Apr. 26, 1994.
WPI Derwent Abstract 95–070480 of JP 930163133.
Chemical Abstract, vol. 103, No. 30 (1985) of JP 60,161, 363.
WPI Abstracts, Acc. No. 89–251885/35 of JP 1182362.
Copy of GB Patent Office Search Report for Application No. GB 9522143.8 dated Jan. 9, 1996.
Copy of FR Patent Office Search Report for Application No. FR 9512621 dated Sep. 23, 1997.

*Primary Examiner*—Peter A. Szekely
*Attorney, Agent, or Firm*—Fish & Richardson P.C.

[57] ABSTRACT

An admixture for use in cementitious compostions which are to be applied in consecutive layers consists essentially of a water-soluble polyalkylene oxide and a superabsorbent material. Optionally (and preferably) also present is a plasticiser or superplasticiser, preferably a polyalkylene oxide-modified styrene-maleic anhydride copolymer.

11 Claims, No Drawings

CONCRETE CURING ADMIXTURES

This is a continuation of application Ser. No. 08/550,188, filed Oct. 30, 1995, now abandoned.

This invention relates to cementitious compositions, more particularly to cementitious compositions for application to substrates in consecutive layers, and most particularly to those which are applied by spraying, and to admixtures for use therein.

It is often required that a cementitious composition be applied in consecutive layers. The best known of such applications is the spraying of cementitious compositions such as "shotcrete", wherein a number of individual layers is applied by means of a shotcreting gun. One of the problems frequently encountered in such applications is cracking and shrinkage of the composition and bonding failures at the layer interfaces. The solution to this problem has hitherto been the application to the sprayed composition of a curing agent, that is, a preparation which is sprayed on the surface and which forms a film thereon. Typical examples include hydrocarbons, fatty acid salts and emulsions of parrafins or microwaxes. Because of the water loss at the surface of sprayed cementitious compositions, this must be done within a very short time of spraying—usually within 15–20 minutes. Moreover, before a further layer can be added, the curing agent must be removed, otherwise it may prevent adequate bonding between adjacent layers of sprayed composition. Various relatively easily-removable curing agents have been made and marketed, but they still involve the time-consuming work of application and renewal.

It has been proposed that the problems of the art may be overcome by using an internal curing agent which comprises a concrete waterproofing agent (such as a parrafin emulsion) and a water retention agent (such as a superabsorbent or, preferably, a polyalkylene oxide).

In a further development of this approach, it has now been found that the disadvantages of the known curing agents may be at least substantially overcome by the use therein of a particular admixture. There is therefore provided, according to the present invention, an admixture for use in cementitious compositions which are to be applied in consecutive layers, consisting essentially of a water-soluble polyalkylene oxide and a superabsorbent material, the admixture optionally containing a superplasticiser which does not interact with polyalkylene oxide.

The water-soluble polyalkylene oxide for use in the invention is an unmodified material; it is thus different from the modified materials which can be used as superabsorbents, as hereinunder described. It has a molecular weight (viscosity average) of from 100,000–8,000,000, preferably from 2,000,000–5,000,000. The requirement that the polyalkylene oxide be water-soluble means that it must comprise a high proportion of ethylene oxide. The preferred material is a polyethylene oxide. Typical commercial products useful in the marking of this invention may be found in the "Polyox" (trade mark) range of Union Carbide Chemicals & Plastics Company, Inc. It is possible and permissible to use more than one such polyalkylene oxide in a composition according to the invention.

By "superabsorbent" is meant a material which is capable of absorbing and holding a very large quantity of water (typically from several hundred to one thousand times its own weight). Such materials have been widely used in diapers and in incontinence and sanitary pads, and are now found in an increasing number of industrial, agricultural and medical applications. Such materials have also been recommended for use in the construction industry, for example, as anti-water flooding agents in tunnel building. Superabsorbents may be prepared, for example, by modifying various types of basic polymers which themselves are not inherently superabsorbents, for example, polyvinyl alcohol and polyethylene oxide types. However, the preferred types are polyacrylates and starch-modified polyacrylates. Materials of this type are commercially available, for example, the "Sanwet" (trade mark) materials of Sanyo Chemical Industries, Tokyo, Japan and Hoechst AG, Frankfurt/Main, Germany. Again, it is possible and permissible to use more than one such superabsorbent.

In a preferred embodiment of the invention, the admixture additionally contains at least one superplasticizer which does not interact with the polyalkylene oxide hereinabove described. The interaction between polyalkylene oxide and certain superplasticisers (particularly β-naphthalene sulphonate-formaldehyde condensate (BNS)) has been proposed for use, for example, in cementitious compositions where a rapid decrease in slump is desired, this being achieved by adding the polyalkylene oxide to the initial mix (with high slump) and the BNS later (when low slump is desired). There are many superplasticizers which are suitable for use in this invention. Details of suitable materials may be found in standard texts such as "Concrete Admixtures Handbook", ed. Ramachandran (Noyes, 1984), the details of which are incorporated herein by reference. Examples include lignosulphonates and sulphonated melamine-formaldehyde condensates.

A preferred class of superplasticizers is that based on styrene-maleic anhydride copolymers ("SMA"). Such superplasticizers have been reported in the patent literature and elsewhere. Any such SMA-based superplasticizer will work in an admixture according to the present invention, but especially preferred SMAs are styrene-maleic anhydride-derived copolymers in free acid or salt form which are selected from the group consisting of those having the following types and numbers of monomer units:

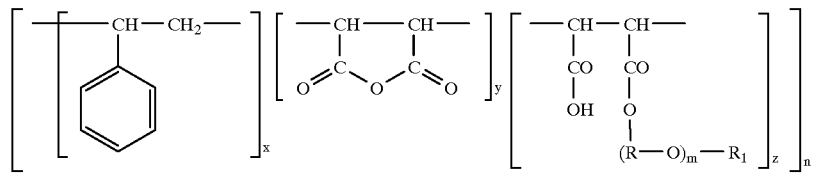

in which R is an $C_{2-6}$ alkylene radical
$R_1$ is a $C_{1-20}$ alkyl-, $C_{6-9}$ cycloalkyl- or phenyl group,
x, y and z are numbers from 0.01 to 100
m is a number from 1 to 100 and
n is a number from 10 to 100
with the provisos, that
i) the ratio of x to (y+z) is from 1:10 to 10:1 inclusive, ii) the ratio of z:y is from 3:1 to 100:1 and iii) m+n=15–100 and those having the following types and numbers of monomer units:

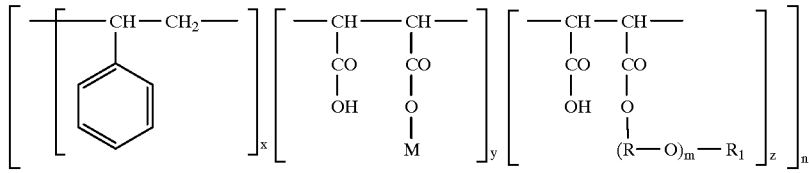

in which M is hydrogen, a cation or the residue of a hydrophobic polyalkylene glycol or polysiloxane, $R_1$, m and n are as hereinabove defined, x, y and z are numbers from 1 to 100 with the provisos that i) the ratio of x to (y+z) is from 1:10 to 10:1 inclusive, ii) the ratio of z:y is from 5:1 to 100:1 and iii) m+n=15–100.

These SMA copolymers are described in U.S. Pat. No. 5,158,916 and French Published Application 2 671 090 the contents whereof are incorporated herein by reference. The cation M may be chosen from a wide variety of materials but preferably is chosen from alkali and alkaline earth metals (especially sodium, potassium and calcium) and alkanolamines.

The relative proportions of polyalkylene oxide and superabsorbent are

| polyalkylene oxide | 0.01–5% | solids by weight |
| superabsorbent | 0.01–10% | " |

In the preferred case where SMA polymer is present, the relative proportions of the three ingredients of an admixture according to the invention are

| SMA | 5–60% | solids by weight |
| polyalkylene oxide | 0.01–2% | " |
| superabsorbent | 0.01–5% | " | the more preferred composition range being

| SMA | 10–30% |
| polyalkylene oxide | 0.2–1.0% |
| superabsorbent | 0.1–0.5% |

In addition to these ingredients, a commercial admixture contains water, the water comprising from 40 to 99.98%, preferably from 65 to 90% by weight of the admixture.

The admixture is made by blending the ingredients with an appropriate quantity of water. The operation is straightforward and may be carried out by conventional machinery. It is sometimes useful to use, in addition to the abovementioned ingredients, a solvent for the polyalkylene oxide. A typical example is a low molecular weight polyethylene glycol (MW typically around 500), used in a proportion of up to 10% by weight of the three ingredients. For the purposes of this invention, it is considered to be part of the polyalkylene oxide. In all cases, the storage stability of the admixture is very good.

The admixture may additionally contain other conventional ingredients of the type usually found in cementitious compositions, these being present in art-recognised quantities and performing their usual functions.

The admixture is used in cementitious compositions at a rate of 0.05–5.0% (by weight liquid admixture on cement). Cementitious compositions comprising and admixture according to the present invention exhibit enhanced properties. For example, there is enhanced bonding between applied layers. This is true of all applications where the compositions are applied in layers, but it is especially good in "wet" process shotcreting, where the cementitious composition is mixed with the mixing water prior to pumping and spraying. The admixture is added at this stage. The invention therefore provides a process of forming a cementitious coating on a substrate, comprising the steps of preparing a hydraulic cementitious mix and applying it to the substrate in consecutive layers, there being incorporated into the mix an admixture as hereinabove described. The invention also provides a solid article (the use of which term includes, among others, a coating on a substrate and a slab (whether free-standing or in situ on a supporting surface)) made of a solidified cementitious composition which comprises an admixture as hereinabove described. The article is preferably layered, that is, built up of individual, consecutively-applied layers of cementitious composition.

The invention is further described with reference to the following non-limiting example.

The following materials are blended together:

| styrene-maleic anhydride copolymer[1] | 19.80 | parts |
| poly(ethylene glycol) MW 500[2] | 1.68 | " |
| poly(ethylene oxide) MW 4,000,000[3] | 0.56 | " |
| superabsorbent material[4] | 0.28 | " |
| water | 77.68 | |

[1]copolymer as prepared in Example 15 of French Published Application 2 671 090
[2]MPEG 500 ex Hoechst
[3]WSR 301 ex Union Carbide
[4]"Sanwet" (trade mark) IM 5000 S The superabsorbent is first mixed with water and the SMA is then added and mixed in until homogeneous. The polyethylene oxide and glycol are then added and mixed until homogeneous.

The admixture prepared as described hereinabove is tested in mortar and concrete mixtures as follows:

Mortar mixture: ¾ by weight fine sand (DIN standard), ¼ ordinary portland cement Concrete mixture: 79% by weight aggregate (0–8 mm, 60% fines 0–4 mm, 40% 4–8 mm) 21% ordinary portland cement The dosages and results are given in the following table; Tests Nos. 1–4 are mortars, Tests Nos. 5–10 are concretes.

| Test No. | dosage of admixture[1] | W/C ratio | flow[2] (cm) | bonding strength[3] (28 day) | compressive strength[4] (28 day) |
|---|---|---|---|---|---|
| 1 | 0[5] | 0.5 | 16 | 0.35 | |
| 2 | 1.5 | 0.5 | 16.8 | 2.00 | |
| 3 | 1.5[6] | 0.5 | 16.0 | 1.63 | |
| 4 | 1.5[7] | 0.5 | 15.3 | 1.49 | |
| 5* | 1.0 | 0.58 | 47.0 | 1.00 | 20.4 |
| 6 | 1.5 | 0.54 | 47.0 | 2.07 | 24.3 |
| 7 | 1.0[8] | 0.56 | 42.0 | 1.45 | 24.0 |
| 8 | 1.5[8] | 0.54 | 42.0 | 1.94 | 23.8 |

*no SMA plasticiser is used in this example
[1] by weight on cement
[2] measured according to test method DIN 18 555
[3] units N/mm²; measured according to test method ZTV-SIB 90
[4] units N/mm²; measured according to test method DIN 1048, performed on 10 cm. tall × 10 cm. diam. concrete cylinders cut from a solid slab of concrete 20 cm. thick
[5] 1.5% of a 20% (wt.) aqueous solution of the abovementioned styrene-maleic anhydride copolymer is added
[6] in this example, the proportion of superabsorbent present in the admixture is reduced by 10%
[7] in this example, the proportion of superabsorbent present in the admixture is reduced by 50%
[8] in these examples, the SMA content of the admixture is reduced by 25%

It can be seen that the compositions according to the invention are appreciably better than those which are not. The increase in bonding strength is particularly noticeable. In addition, the surface appearance of the concrete looked very homogeneous and there was less tendency to crack formation.

We claim:

1. A cementitious composition curing admixture, consisting essentially of a water-soluble polyalkylene oxide having a viscosity average molecular weight of from 100,000 to 8,000,000 and a superabsorbent material, the admixture optionally additionally containing a superplasticizer which does not interact with polyalkylene oxide.

2. A cementitious composition curing admixture according to claim 1, wherein the polyalkylene oxide has a viscosity average molecular weight of from 2,000,000 to 5,000,000.

3. An aqueous admixture which comprises a cementitious composition curing admixture according to claim 1, wherein the relative proportions of polyalkylene oxide and superabsorbent are

| polyalkylene oxide | 0.01–5% solids by weight |
| superabsorbent | 0.01–10% solids by weight |
| water | 40–99.98% by weight. |

4. A cementitious composition curing admixture according to claim 1, wherein the superabsorbent material is selected from the group consisting of polyacrylates and starch-modified polyacrylates.

5. A cementitious composition curing admixture consisting essentially of:

a water soluble polyalkylene oxide having a viscosity average molecular weight of from 100,000 to 8,000,000;

a superabsorbent material, and at least one superplasticizer which does not react with the polyalkylene oxide of the admixture.

6. A cementitious composition curing admixture according to claim 5, wherein the superplasticizer is based on styrene-maleic anhydride copolymer.

7. An aqueous admixture which comprises a cementitious composition curing admixture according to claim 6, wherein the relative proportions of ingredients in the admixture are

| styrene-maleic anhydride | 5–60% by weight |
| polyalkylene oxide | 0.01–2% solids by weight |
| superabsorbent | 0.01–5% solids by weight |
| water | 40–99.98% by weight. |

8. An aqueous admixture which comprises a cementitious composition curing admixture according to claim 6, wherein the relative proportions of ingredients in the admixture are

| styrene-maleic anhydride | 10–30% solids by weight |
| polyalkylene oxide | 0.02–1.0% solids by weight |
| superabsorbent | 0.1–0.5% solids by weight |
| water | 40–99.98% by weight. |

9. A cementitious composition curing admixture consisting essentially of a water soluble polyalkylene oxide having a viscosity average molecular weight of from 100,000 to 8,000,000; and, a superabsorbent material, and a superplasticizer based on a styrene-maleic anhydride copolymer which does not react with the polyalkylene oxide of the admixture, wherein the styrene-maleic anhydride copolymer is selected from styrene-maleic anhydride derived copolymers in free acid or salt form having the following types and numbers of monomer units:

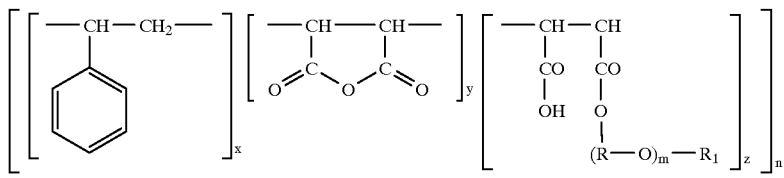

in which:

R is a $C_{2-6}$ alkylene radical $R_1$ is a $C_{1-20}$ alkyl-, $C_{6-9}$cycloakyl- or phenyl group, x, y and z are numbers from 0.01 to 100 m is a number from 1 to 100 and n is a number from 10 to 100 with the provisos, that i) the ratios of x to (y+z) is from 1:10 to 10:1 inclusive, ii) the ratio of z:y is from 3:1 to 100:1, and iii) m+n=15–100;

and, those having the following types and numbers of monomer units:

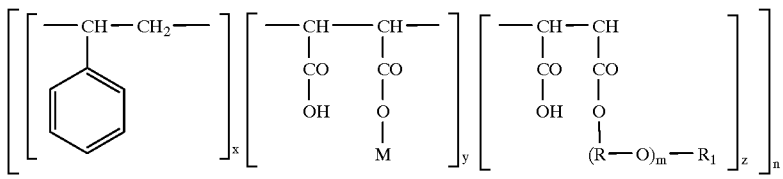

in which:
M is hydrogen, a cation or a residue of a hydrophobic polyalkylene glycol or polysiloxane,
$R_1$ is a $C_{1-20}$ alkyl-, $C_{6-9}$ cycloakyl- or phenyl group,
x, y and z are numbers from 1 to 100
m is a number from 1 to 100 and
n is a number from 10 to 100
with the provisos that
i) the ratio of x to (y+z) is from 1:10 to 10:1 inclusive;
ii) the ratio of z:y is from 5:1 to 100:1 and
iii) m+n=15–100.

10. An aqueous admixture which comprises a cementitious composition curing admixture according to claim 9, wherein the relative proportions of ingredients in the admixture are:

| | |
|---|---|
| superplasticizer | 5–60% solids by weight |
| polyalkylene oxide | 0.01–2% solids by weight |
| superabsorbent | 0.01–5% solids by weight |
| water | 40–99.98% by weight. |

11. An aqueous admixture which comprises a cementitious composition curing admixture according to claim 10, wherein the relative proportions of ingredients in the admixture are:

| | |
|---|---|
| superplasticizer | 10–30% solids by weight |
| polyalkylene oxide | 0.02–1.0% solids by weight |
| superabsorbent | 0.1–0.5% solids by weight |
| water | 40–99.98% by weight. |

* * * * *